US012598153B1

(12) United States Patent
Musheer et al.

(10) Patent No.: US 12,598,153 B1
(45) Date of Patent: Apr. 7, 2026

(54) VALIDATING ROBUSTNESS OF NETWORKING ROUTES FOR DIGITAL MESSAGE DELIVERY AND ARCHIVAL

(71) Applicant: Morgan Stanley Services Group Inc., New York, NY (US)

(72) Inventors: Roshan Musheer, Monmouth Junction, NJ (US); Amit Khare, Monmouth Junction, NJ (US); Chi Chiu Kwok, Ottawa (CA); Parth Nathwani, Whitby (CA); June Y. Zheng Jorgensen, Bedford (CA); José Pérez, Woodstock, GA (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/313,751

(22) Filed: Aug. 28, 2025

(51) Int. Cl.
    *H04L 51/23*     (2022.01)
    *G06F 16/11*     (2019.01)

(52) U.S. Cl.
    CPC ............ *H04L 51/23* (2022.05); *G06F 16/113* (2019.01)

(58) Field of Classification Search
    CPC ...... H04L 51/21; H04W 24/00; H04W 24/08; H04W 24/06; H04W 4/14; H04W 4/12
    See application file for complete search history.

(56) References Cited

U.S. PATENT DOCUMENTS

| | | | |
|---|---|---|---|
| 8,504,083 B1 * | 8/2013 | Gill | H04W 4/14 |
| | | | 455/452.2 |
| 10,778,837 B2 | 9/2020 | Moshir et al. | |
| 2010/0137011 A1 * | 6/2010 | Li | H04W 4/14 |
| | | | 455/466 |
| 2014/0370843 A1 * | 12/2014 | Cama | H04W 24/08 |
| | | | 455/405 |
| 2019/0373107 A1 | 12/2019 | Moshir et al. | |
| 2020/0412867 A1 * | 12/2020 | Moshir | H04W 12/02 |
| 2021/0029536 A1 | 1/2021 | Won et al. | |

* cited by examiner

*Primary Examiner* — Caroline H Jahnige
(74) *Attorney, Agent, or Firm* — Duane Morris LLP

(57) ABSTRACT

Systems and methods are disclosed for validating and managing the archiving of networked messages sent to mobile devices. An auditing message including a unique code is transmitted to each selected mobile device, with metadata linked to the message stored in a test database. The archiving path of the auditing message is identified based on the device location, and delivery status reports are received to verify whether the auditing message has been stored in an electronic archive. Upon determining that the auditing message is not archived, a remedial workflow is determined and remedial messages are sent to accounts associated with devices along the archiving path to address archiving failures. The system further supports diagnostic reporting, remediation actions including disabling messaging functionality, and preventive measures through machine learning analysis of historical audit data.

20 Claims, 6 Drawing Sheets

505 — Receive a set of mobile device identifiers, each mobile device identifier associated with a respective mobile device of a plurality of mobile devices, each mobile device configured to receive messages 510 — Store an auditing message including a unique code in a test database 515 — Link the auditing message with first metadata including a timestamp, mobile information regarding a selected mobile device of the plurality of mobile devices, and carrier information regarding a carrier system 520 — Cause transmitting a first copy of the auditing message for delivery to the selected mobile device 525 — Identify an archiving path of devices in which the first copy of the auditing message travels before being stored in an electronic archive based on a location of the selected mobile device 530 — Receive a report indicating a status of delivering the first copy of the auditing message 535 — Determine that no match of the auditing message is stored in the electronic archive 540 — Determine a remedial workflow based on the first metadata and the report 545 — Send a remedial message to an internal account or an account associated with a device in the archiving path based on the remedial workflow

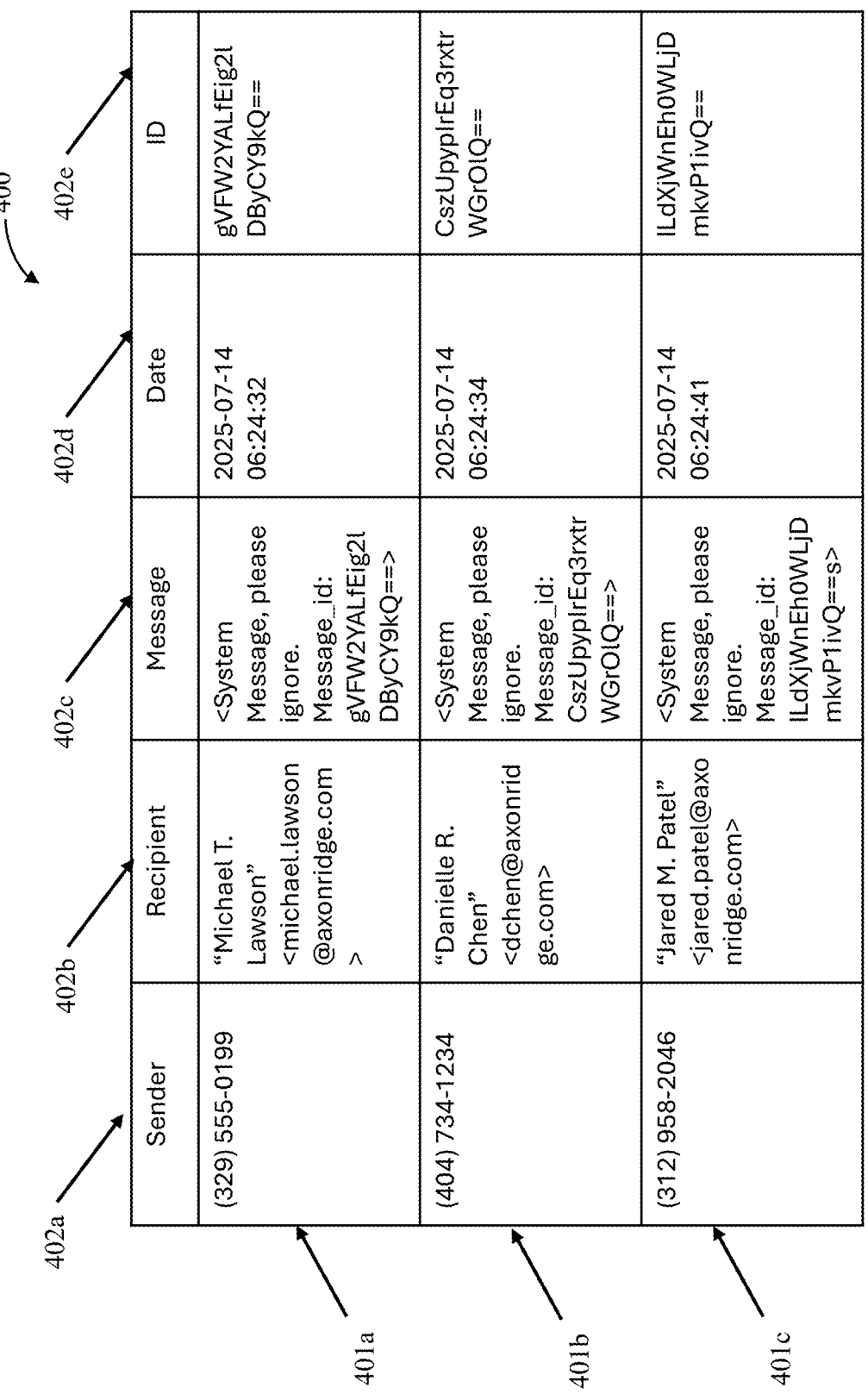

| Sender | Recipient | Message | Date | ID |
|---|---|---|---|---|
| (329) 555-0199 | "Michael T. Lawson" <michael.lawson @axonridge.com > | <System Message, please ignore. Message_id: gVFW2YALfEig2t DByCY9kQ==> | 2025-07-14 06:24:32 | gVFW2YALfEig2t DByCY9kQ== |
| (404) 734-1234 | "Danielle R. Chen" <dchen@axonrid ge.com> | <System Message, please ignore. Message_id: CszUpyplrEq3rxtr WGrOIQ==> | 2025-07-14 06:24:34 | CszUpyplrEq3rxtr WGrOIQ== |
| (312) 958-2046 | "Jared M. Patel" <jared.patel@axo nridge.com> | <System Message, please ignore. Message_id: ILdXjWnEh0WLjD mkvP1ivQ===s> | 2025-07-14 06:24:41 | ILdXjWnEh0WLjD mkvP1ivQ== |

*FIG. 4*

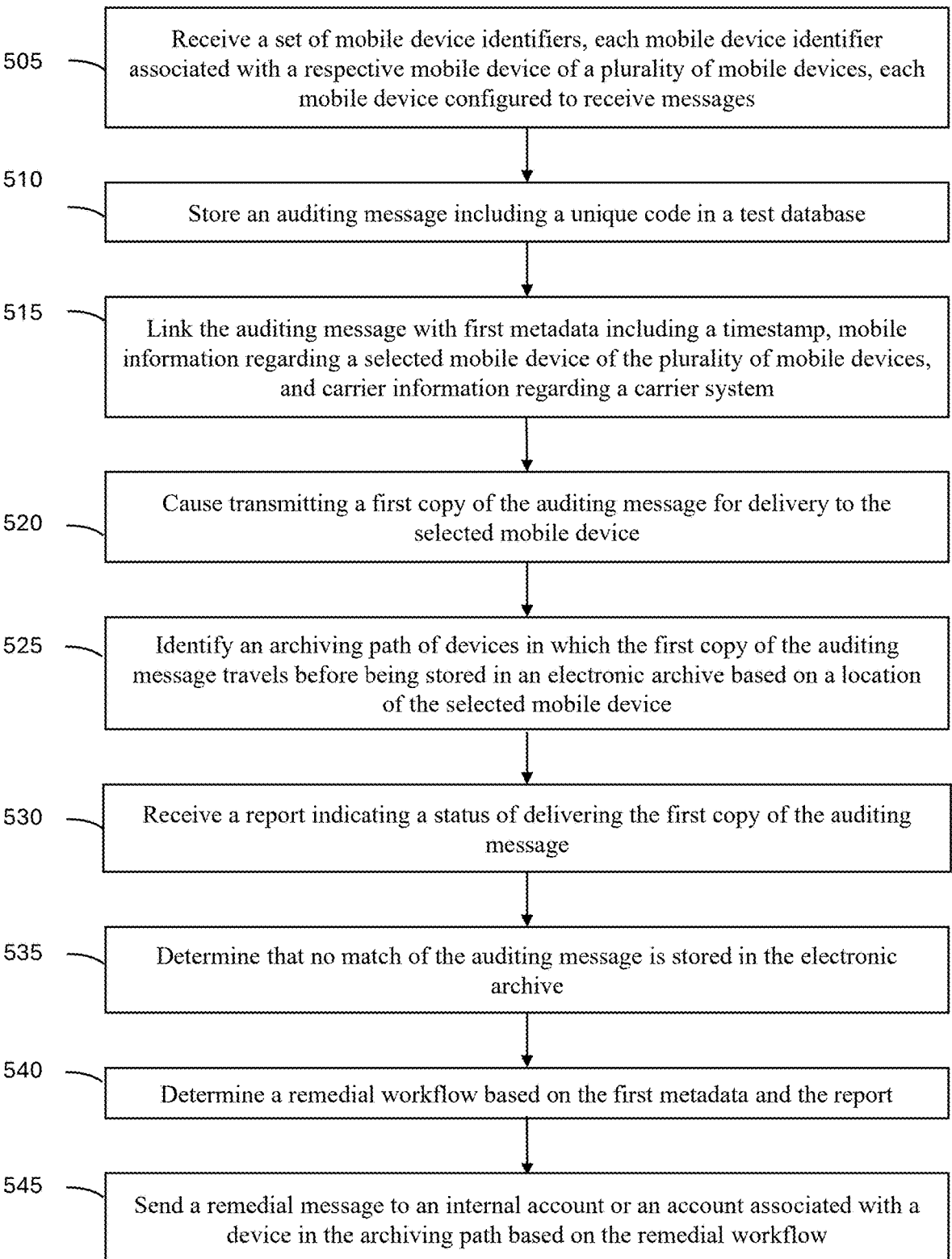

505 — Receive a set of mobile device identifiers, each mobile device identifier associated with a respective mobile device of a plurality of mobile devices, each mobile device configured to receive messages 510 — Store an auditing message including a unique code in a test database 515 — Link the auditing message with first metadata including a timestamp, mobile information regarding a selected mobile device of the plurality of mobile devices, and carrier information regarding a carrier system 520 — Cause transmitting a first copy of the auditing message for delivery to the selected mobile device 525 — Identify an archiving path of devices in which the first copy of the auditing message travels before being stored in an electronic archive based on a location of the selected mobile device 530 — Receive a report indicating a status of delivering the first copy of the auditing message 535 — Determine that no match of the auditing message is stored in the electronic archive 540 — Determine a remedial workflow based on the first metadata and the report 545 — Send a remedial message to an internal account or an account associated with a device in the archiving path based on the remedial workflow

*FIG. 5*

VALIDATING ROBUSTNESS OF NETWORKING ROUTES FOR DIGITAL MESSAGE DELIVERY AND ARCHIVAL

TECHNICAL FIELD

The present disclosure relates to message routing validation in communication networks, and more particularly, using an archiving model to validate robustness of networking routes for digital messaging on mobile devices.

BACKGROUND

Digital messaging on organizational mobile devices has become a cornerstone of enterprise communication, enabling employees to exchange information efficiently and securely regardless of location. Short Message Service (SMS) messages, in particular, remain widely used for operational notifications, security alerts, and customer interactions. Accurate recordation and archiving of these messages are critical for compliance with regulatory requirements, internal audits, legal discovery, and organizational governance.

The architecture supporting SMS message delivery and archiving often involves a complex network of components, including mobile carriers, message aggregators, third-party archiving vendors, and mobile device management systems. Messages typically traverse multiple intermediary devices and services before being stored in an electronic archive. This multi-stage routing creates significant challenges in tracking message paths, verifying delivery status, and ensuring comprehensive archiving.

Existing solutions for message archiving frequently provide limited visibility into the actual routing and handling of SMS messages. Without precise identification of the message routing and archiving path and the involved systems, organizations struggle to detect incomplete or failed message archiving events. Such gaps can lead to missing records, audit discrepancies, regulatory violations, and potential operational risks. Moreover, troubleshooting archiving issues is complicated by the lack of standardized reporting and diagnostic information across different vendors and carriers.

To address these challenges, it would be helpful to have advanced methods that enable robust determination and validation of messaging routes used in organizational SMS communications.

SUMMARY

The appended claims may serve as a summary of the invention.

BRIEF DESCRIPTION OF THE DRAWINGS

Example embodiments will now be described by way of non-limiting examples with reference to the accompanying drawings, in which:

FIG. 4 illustrates an example archiving report to support determination of remedial workflows.

FIG. 5 illustrates a method for managing message recordation as claimed in the present disclosure.

DETAILED DESCRIPTION OF CERTAIN EMBODIMENTS

Figure 1:
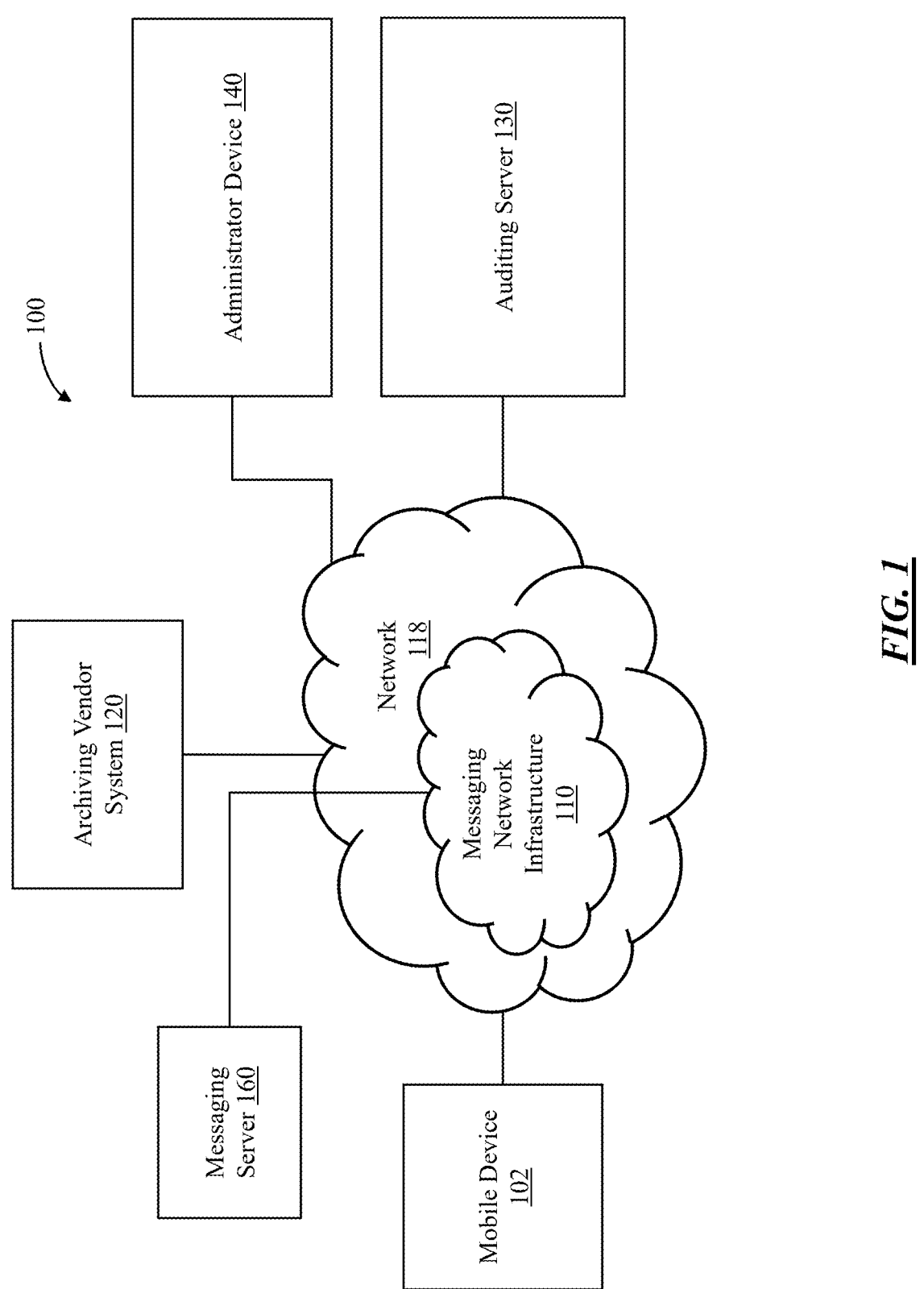
FIG. 1 illustrates an example networked system in which various embodiments may be practiced.

In the following description, for the purposes of explanation, numerous specific details are set forth in order to provide a thorough understanding of the example embodiment(s) of the present invention. It will be apparent, however, that the example embodiment(s) may be practiced without these specific details. In other instances, well-known structures and devices may be shown in block diagram form in order to avoid unnecessarily obscuring the example embodiment(s).

1. GENERAL OVERVIEW

The disclosed systems and methods manage the recordation of digital messaging on organizational mobile devices by sending auditing messages containing unique codes to selected devices. The process begins by receiving a set of mobile device identifiers corresponding to a plurality of mobile devices, each capable of receiving digital messages. An auditing message including a unique code is stored in a test database and linked with metadata such as timestamps, mobile device information, and carrier system details to facilitate tracking and correlation.

A first copy of the auditing message is transmitted to the selected mobile device, and the system identifies the archiving path through which the message travels before being stored in an electronic archive. This archiving path can include one or more intermediary devices or systems, which can append unique device identifiers to the message as it is forwarded. Identifying this path allows the system to determine which devices and systems handle the message during archiving.

The system receives delivery status reports from sources such as message aggregators, wireless carriers, or archiving vendors. These reports include diagnostic information such as error codes, delivery logs, or failure reasons, which are used to assess whether the auditing message was successfully delivered and archived. The report data supports the determination of remedial workflows when archiving failures are detected.

To confirm archiving success, the system compares the unique code from the auditing message against archived message data retrieved from the electronic archive. In some embodiments, the system can compare other portions of the auditing message, including the entire auditing message, or a hash or signature of the auditing message against the archived message data. It is contemplated that the unique code can be a sequence of characters, and can also be a portion of or the entire auditing message. The archive can store both auditing messages and other electronic communications. If no match is found, indicating the auditing message was not stored, the system proceeds to analyze failure reasons, which can include device offline status, network disruptions, or improper device onboarding and configuration.

Based on the identified failure reasons and report data, the system determines appropriate remedial workflows. These workflows can involve sending notifications to end users to power on or connect their devices, instructing archiving devices to retry message archiving, disabling messaging functionality on affected devices to prevent further data loss, or retransmitting the auditing message. Additional diagnostic reports from archiving devices can be used to further refine the remedial actions.

The disclosed methods further enable ongoing analysis by reviewing multiple audit reports and audit results over a defined time period. Utilizing a machine learning module, the system identifies patterns indicative of recurring archiving failures and applies preventive measures to mitigate future issues, thereby enhancing the reliability and robustness of the digital messaging archiving process.

The disclosed system and method provide significant technical benefits by enhancing the reliability, traceability, and robustness of digital message archiving on organizational mobile devices. By embedding unique codes in auditing messages and tracking their delivery and archiving status through multiple metadata points, the system improves accuracy in detecting message loss or failures within complex networking routes. This leads to greater confidence in compliance with organizational policies and regulatory requirements related to electronic communications recordkeeping.

The method streamlines error detection and remediation by automatically correlating delivery status reports, diagnostic information, and archival data. Such correlation accelerates identification of root causes, such as device offline conditions, network disruptions, or misconfigurations. The system's ability to dynamically determine remedial workflows tailored to specific failure scenarios enhances digital operational efficiency and reduces downtime in message archiving processes.

Leveraging detailed archiving path identification and device-level metadata appended to messages enables granular visibility into each stage of message transmission and storage. This granular auditing capability supports comprehensive forensic analysis and accountability, which is critical in regulated industries and organizations with stringent data governance requirements. The system's capacity to flag missing messages and trigger retransmission or corrective actions further bolsters data integrity.

The incorporation of machine learning techniques to analyze historical audit reports or other data related to an internal user account or the operation or maintenance histories other systems in the archiving path and identify failure patterns enables proactive prevention of future archiving issues. By learning from past incidents, the system can implement targeted interventions before failures propagate, thereby increasing system resilience and reducing operational risk. This continuous improvement mechanism enhances long-term archiving reliability and supports scalable management of large mobile device populations.

The system's communication with diverse network entities, such as wireless carriers, message aggregators, and archiving vendors, ensures that audit data and remedial commands are coordinated across the full archiving path. This end-to-end coordination minimizes gaps in recordation coverage and enhances overall system robustness, enabling organizations to maintain comprehensive and verifiable archives of mobile messaging.

Overall, the disclosed methods reduce the likelihood of undetected message loss, provide actionable intelligence for timely remediation, and support organizational compliance with electronic recordkeeping standards. These methods also reduce the utilization of computing resources by quickly homing in on potential sources of issues in the archiving path and increasing mobile messaging throughput.

2. EXAMPLE COMPUTING ENVIRONMENTS

FIG. 1 illustrates an example system 100 comprising multiple organizational mobile devices 102, a messaging network infrastructure 110, an archiving vendor system 120, and an auditing server 130, an administrator device 140, and a messaging server 160, all communicatively coupled over one or more wired and/or wireless networks 118. Each of these components can be implemented using one or more physical or virtual computing devices, including servers, smartphones, tablets, desktop or laptop computers, network appliances, or cloud-hosted services, each programmed to perform their respective functions as described herein.

The organizational mobile devices 102 are typically smartphones or tablets issued to or otherwise controlled by an organization's employees or agents. These devices operate client-side software applications that enable digital messaging such as SMS, multimedia messaging service (MMS), or other communication protocols. The client applications embed unique auditing identifiers or codes into outbound messages, collect metadata such as timestamps, message status, sender and receiver identifiers, and device context information, and transmit this data alongside messages through the messaging network infrastructure 110. The mobile devices 102 further support receipt and display of auditing messages and prompts generated during the auditing process.

Each organizational mobile device 102 includes standard hardware components such as processors, memory, local storage, communication interfaces (e.g., cellular radios, Wi-Fi adapters, Bluetooth), and input/output devices (e.g., touchscreen displays, microphones, speakers). Software modules executing on these devices handle message composition, auditing code embedding, secure communication, local storage of audit data, and user interactions with auditing messages. Security features such as encryption, secure key storage, and device authentication can be employed to ensure message integrity and confidentiality. In some embodiments, the mobile device 102 can be configured to only communicate over a subset of protocols available to the mobile device 102. For example, the mobile device 102, despite being technically capable of communicating over Rich Communication Services (RCS), and being connected to a messaging network infrastructure 110 capable of provisioning RCS, the mobile device 102 can nevertheless be prevented from utilizing RCS. Certain protocols can embody or enable features which impede or prevent effective auditing, such as additional encryption of messaging contents at a messaging layer or envelope lower than the messaging layer exposed or available to the archiving vendor system 120.

The archiving vendor system 120 comprises one or more servers or cloud-hosted platforms operated by third-party or internal service providers responsible for archival of digital messages. These systems receive messages forwarded by the messaging network infrastructure 110 or directly from organizational mobile devices 102, process and index the messages for long-term storage. They can help ensure regulatory compliance with applicable standards. The archiving vendor systems extract embedded auditing codes and associated metadata, generate audit reports containing message status, delivery confirmation, error codes, and archival timestamps, and provide application programming interfaces (APIs) or communication interfaces for querying and transmitting this information to the auditing server 130.

The archiving vendor system 120 includes hardware such as redundant storage arrays, secure database servers, backup systems, and networking equipment. Software components can include message ingestion modules, indexing and search engines, compliance validation engines, report generators, and secure APIs for data access. The system can also implement security controls including encryption at rest and in transit, access control, logging, and intrusion detection to safeguard message data integrity and confidentiality.

The auditing server 130 is a dedicated computing system or cluster configured to receive, process, and analyze auditing data collected from the archiving vendor system 120 and organizational mobile devices 102. This server correlates message delivery and archival information, compares metadata records to validate the robustness of message routing paths, detects discrepancies or failures in message recordation, and generates remedial workflows or alert notifications. The auditing server maintains audit logs, user activity histories, and compliance reports to support organizational oversight and regulatory requirements.

The auditing server 130 can consist of high-performance computing hardware such as multi-core processors, large memory banks, persistent storage, and high-speed network interfaces. Software modules hosted on the auditing server include data aggregation engines, correlation algorithms, rule-based validation systems, workflow orchestration tools, and user interface components for monitoring and management. The auditing server can also integrate with organizational identity and access management (IAM) systems for secure authentication and authorization of audit personnel.

The administrator device 140 can include computing hardware capable of reviewing reports or data produced by the auditing server 130. The administrator device 140 can also provide instructions and configuration information to the archiving vendor system 120 to configure the functionality of the archiving vendor system 120. The administrator device 140 can transmit instructions to the mobile device 102 to instruct the mobile device 102 to respond with status information, such as network status and geographic location, and can transmit instructions to disable the mobile device 102, or to ensure that data on the mobile device 102 cannot be deleted or modified by the mobile device 102. The administrator device 140 can also transmit instructions to the messaging network infrastructure 110 to instruct the messaging network infrastructure to respond with the status information of the mobile device 102 or the messaging network infrastructure 110, and can instruct the messaging network infrastructure 110 to reroute, curtail, block, or otherwise reduce or prevent network traffic otherwise transmitted to or from the mobile device 102. In some embodiments, the administrator device 140 with at least some of the described functionality is integrated with the auditing server 130.

The messaging server 160 can comprise message aggregators; message carriers, message gateways, or systems managing Internet-based messaging services. It manages the transmission, receipt, and routing of message data between client devices and network services. It incorporates a message processing module configured to handle various message formats and protocols, enabling interoperability across disparate messaging platforms. The messaging server 160 can also maintain message queues to ensure reliable delivery or employ security mechanisms such as encryption and authentication to protect message integrity and confidentiality. The messaging server 160 interfaces with both the user devices and external communication networks, thereby facilitating real-time message exchange and synchronization across multiple endpoints.

The network(s) 118 connecting the organizational mobile devices 102, messaging network infrastructure 110, archiving vendor system 120, and auditing server 130 include a variety of wired and wireless communication technologies. These can encompass cellular networks (including 3G, 4G LTE, 5G), Wi-Fi networks, Bluetooth or near-field communication (NFC) links, local area networks (LANs), wide area networks (WANs), the public Internet, private virtual networks (VPNs), or dedicated leased lines.

In certain embodiments, the network 118 can be divided into segregated network zones, including demilitarized zones (DMZs) or private cloud environments, to comply with data residency and regulatory mandates. Network segmentation and role-based access control policies can restrict communication flows to authorized pathways only.

The messaging network infrastructure 110 encompasses the communication systems responsible for routing and delivering digital messages between organizational mobile devices 102 and archiving vendor system 120. This infrastructure can support protocols such as GSM, CDMA, LTE, or 5G or the Internet. The messaging network infrastructure 110 support the messaging server 160, enabling message transport, queuing, delivery attempts, retries, error reporting, and the generation of delivery receipts or failure notifications. Network components can log detailed diagnostic data including timestamps, routing paths, error codes, and transmission status, which are useful for auditing and validation purposes.

The interplay between these components enables end-to-end tracking and validation of digital message recordation on organizational mobile devices. The auditing server initiates generating messages embedded with auditing information and saves local copies; the messaging servers routes and delivers the messages to the mobile devices through the messaging network infrastructure while generating diagnostic data; the archiving vendor captures and stores message copies and audit metadata; and the auditing server aggregates and analyzes all the data including the local copies and audit copies to determine the robustness of message recordation and initiate corrective workflows when necessary.

Each computing device within system 100 executes software applications and services tailored to its role in the message auditing framework, operating in coordination through standardized APIs, messaging protocols, and data formats. These interactions facilitate real-time or near-real-time auditing, reporting, and compliance management as claimed.

The system architecture supports extensibility, allowing integration with additional systems such as enterprise security information and event management (SIEM) platforms, compliance monitoring tools, or workflow automation services to further enhance auditing capabilities and organizational governance.

3. FUNCTIONAL DESCRIPTIONS

The system 100 illustrated in FIG. 1 includes different components configured to perform various functions related to the auditing, verification, and validation of digital message recordation. In some embodiments, except for auditing server 130 and other components that can be integrated thereinto, all the components in the system 100, including the mobile devices 102, messaging network infrastructure 110, and archiving vendor system 120, are described to provide background information. The different components may be implemented as software modules, firmware routines, hardware components (whether general-purpose or specialized), or any combination thereof. The following descriptions are intended to provide contextual information regarding the operational environment in which the auditing server 130 operates.

In some embodiments, the organizational mobile devices 102 are equipped with client-side applications or embedded software modules that facilitate the creation, sending, and receipt of digital messages, such as SMS or other communication protocols. These devices generate unique auditing identifiers and embed such metadata directly within outgoing messages. Additionally, the mobile devices collect supplemental metadata related to the message transmission, including precise timestamps, sender and recipient identifiers, device location data (when permissible), and device state information such as connectivity status and network type. These embedded auditing codes and metadata serve as secure, tamper-evident markers that enable end-to-end traceability of each message throughout its lifecycle.

The client-side application on the organizational mobile devices 102 also tracks message generation events in real time and maintains a local cache or log of all sent messages with their corresponding auditing information. This local repository can be queried by the auditing server 130 or internal compliance software to verify that message transmissions have been initiated and accounted for correctly. Furthermore, the mobile devices can execute secure handshake protocols with network infrastructure components to authenticate message origination and ensure that messages conform to organizational policies and auditing requirements before transmission.

The messaging network infrastructure 110 serves as the transport layer facilitating the reliable routing, delivery, and receipt acknowledgment of digital messages generated by the organizational mobile devices 102. This network infrastructure can include cellular network elements, SMS gateways, or internet-based messaging routers, which cooperate to forward messages from the sender to the recipient or onward to archiving vendor system 120. During transit, the messaging network infrastructure 110 captures diagnostic information such as message routing paths, hop counts, delivery timestamps, and status codes, including success confirmations, transient failures, or permanent delivery errors.

These diagnostic and delivery status data are communicated back to the auditing server 130 and can be separately forwarded to the archiving vendor system 120 to maintain a complete record of the message delivery lifecycle. The messaging network infrastructure 110 also enforces security protocols such as encryption, message integrity checks, and access control to protect the confidentiality and authenticity of the transmitted messages. Additionally, it supports failover and retry mechanisms to maximize delivery reliability and minimize data loss.

The archiving vendor system 120 acts as an archiving engine for received digital messages and their corresponding auditing metadata. Upon receipt of a message, the archiving vendor system 120 parses embedded auditing codes and extracts all relevant metadata for indexing and secure storage. The system maintains tamper-resistant audit logs and enforces data retention policies compliant with applicable regulatory frameworks, such as financial or healthcare industry standards. The archiving vendor system 120 also generates detailed audit reports, which include message archival status, timestamps of receipt, and any error or exception codes encountered during message processing or storage.

These audit reports are made accessible to the auditing server 130 and other organizational compliance systems via secure APIs or batch data transfers. The reports facilitate downstream analytics and validation processes, providing key insights into message integrity, archival completeness, and potential discrepancies between message origination and archival confirmation. The archiving vendor system 120 also supports data retrieval requests for legal discovery or internal investigations, leveraging the embedded auditing metadata to precisely identify and locate messages of interest.

The auditing server 130 serves as the processing and decision-making node within the system 100 according to embodiments described herein. It aggregates auditing data collected from the organizational mobile devices 102, messaging network infrastructure 110, and archiving vendor system 120 to perform comprehensive correlation and validation of message recordation. This includes cross-referencing message metadata, delivery receipts, and archival reports to identify missing messages, duplicated records, or inconsistencies indicative of message loss, tampering, or system faults.

In response to detected anomalies or compliance gaps, the auditing server 130 initiates corrective workflows such as generating alerts to an administrator device 140, triggering automated resubmission of auditing message transmissions or auditing report compilations, or invoking remedial auditing procedures. The auditing server can also generate comprehensive audit summaries and dashboards that provide organizational stakeholders with real-time visibility into messaging system performance and compliance status. These outputs support internal audits, regulatory reporting, and continuous process improvement.

The integrated operation of the different components in the system 100 creates a closed-loop auditing environment that enables the detection of message archival errors at multiple points in the messaging and subsequent archiving process. This architecture ensures that messages generated by the organization are tracked continuously from origination to final archival storage and auditing review, providing high assurance of compliance, traceability, and accountability throughout the message lifecycle.

3.1. Transmitting and Storing Auditing Messages

Figure 2:
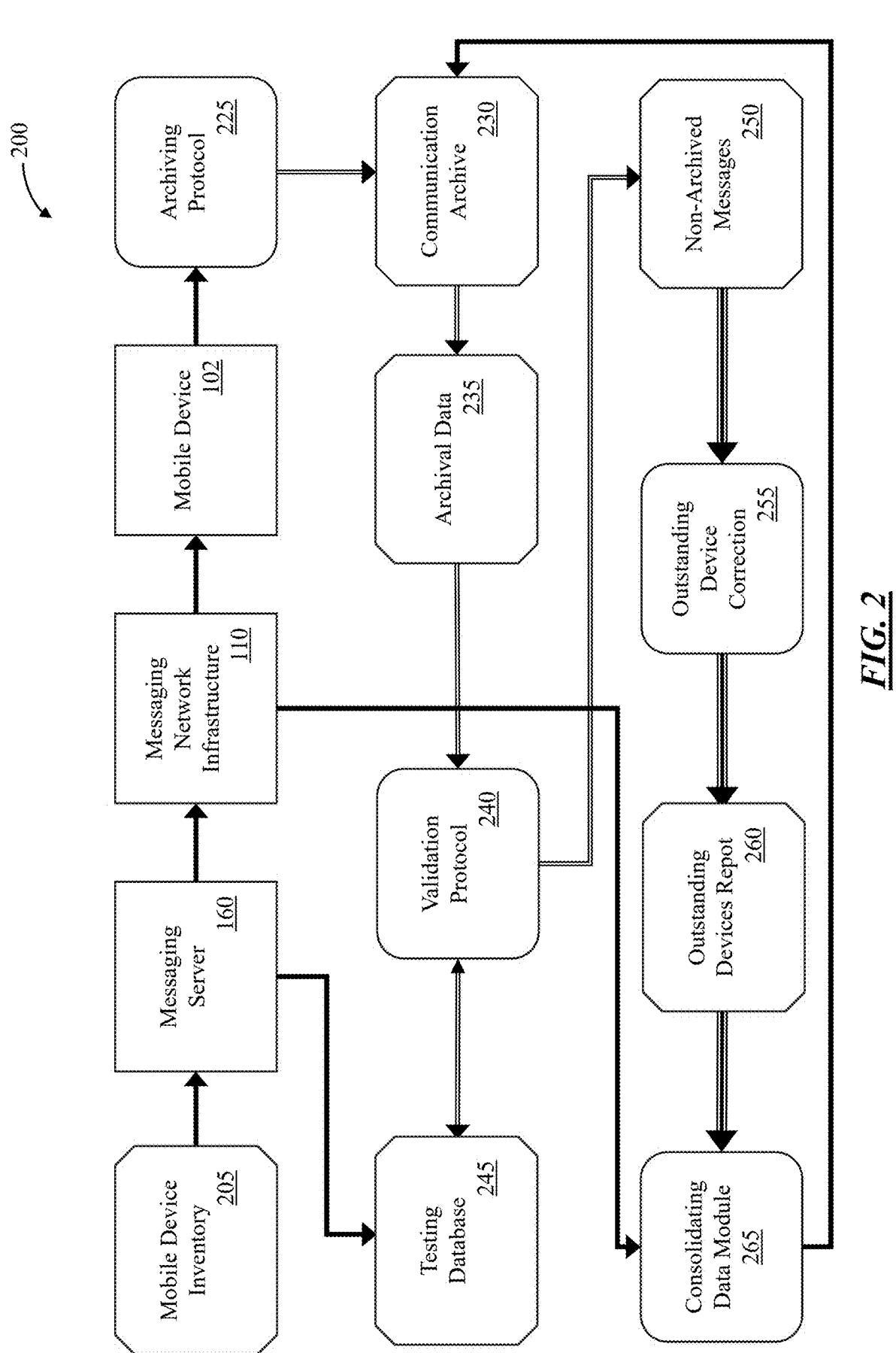
FIG. 2 illustrates a process featuring devices, data packets, and methods facilitating the auditing process.

Referring now to FIG. 2, a process flow diagram 200 is illustrated for performing a validation and auditing process for digital messaging archival systems. The system includes interconnected components and protocols that collectively enable end-to-end tracking, validation, and remediation of digital message archiving performed by the auditing server 130 for a fleet of corporate mobile devices. The elements in FIG. 2 are depicted in different forms to indicate different functions or purposes. The rectangles indicate components illustrated in FIG. 1 and external to the auditing server 130. The boxes with angled edges indicate data storage, and the boxes with rounded edges indicate data processing. The edges different arrow styles indicate different stages of processing, as discussed in Sections 3.1 through 3.3.

The mobile device inventory 205 maintains a list of mobile devices subject to messaging archiving compliance. This inventory includes device identifiers, phone numbers, user associations such as user identifiers or accounts linked to particular mobile devices or particular application instances operating on certain mobile devices, mobile device management (MDM) status, and carrier information. The mobile device inventory 205 is stored in or coupled to the auditing server 130 as an internal database. The auditing server 130 periodically initiates the validation process by sending auditing messages, either directly from a physical device or through a messaging platform such as the messaging server 160. The auditing server 130 manages the registration and delivery of auditing messages based on the mobile device inventory 205 list of subject mobile devices, ensuring that every corporate device is tested in a controlled manner.

The messaging server 160 receives the list of target devices and generates auditing digital messages, each containing a universally unique identifier (UUID). Each auditing message is time-stamped and logged in the Testing Database 245. Simultaneously, a copy of the message is sent to the messaging network infrastructure 110 for delivery to the intended device. The auditing server 130 can receive a copy of each auditing message, and either receives the copy with a timestamp or adds a timestamp upon receipt. The auditing server 130 can then place the timestamped message in the testing database 245. In alternative embodiments, the auditing server 130, when requesting that the auditing messages be sent, also transmits instructions to the messaging server 160 to timestamp and log the messages directly in the testing database 245, as well as any required credentials, parameters, or protocols to facilitate the logging by the messaging server 160. In another alternative, the administrator device 140 has previously provisioned the messaging server 160 with both logging instructions and necessary credentials, such that the messaging server 160 logs each auditing message into the testing database 245 without requiring real-time logging instructions from the auditing server 130. In some embodiments, the records in the testing database 245 can be structured like or include the data from the archiving report 400 (See FIG. 4).

In some embodiments, the messaging server 160 can comprise a cloud-based SMS delivery platform or on-premises application capable of interfacing with multiple message aggregators or carriers. The messaging server 160 can include logic for abstracting away the underlying carrier routing and message formatting. This allows the auditing server 130 to simply specify a mobile phone number or device identifier, without needing to manage the complexity of selecting a specific telecommunications provider. Examples of messaging vendors can include SMS gateway providers or proprietary in-house messaging systems designed to handle large-scale enterprise message routing across carrier networks.

The messaging server 160 in connection with the network messaging infrastructure 110 handles the actual message delivery over a wireless network. It transmits the auditing message to the mobile device 102. The messaging server 160 can also produce delivery status logs, which are later used during validation. Additionally, the messaging server 160 can share communication metadata with the consolidating data module 265, which is an internal component of the auditing server 130. The purpose of the consolidating data module 265 is to aggregate and normalize data such as delivery status, error logs, timestamps, and user/device mapping, and then add this additional metadata to the internal communication archive 230. This enriched metadata enables the validation protocol 240 to better correlate delivery events with archiving outcomes.

The mobile device 102 is the endpoint recipient of the auditing message. Upon receipt, depending on the device's configuration and the archiving mechanism in place, the message is passed along to the archiving protocol 225. In some cases, the archiving can occur on the device; in other cases, archiving can occur entirely on the network or cloud side. The delivery to the mobile device 102 and proper configuration of the mobile device for archival help ensure archiving works as intended.

From the perspective of the mobile device 102, the auditing message (shown in further detail as auditing message 310 in FIG. 3) can appear similar to a regular message, though its purpose is entirely diagnostic. In some embodiments, the message can include a short prefix or suffix such as "System Message" or "SMS Archive Test" to prevent user confusion. In other cases, the message can be hidden from view or delivered silently using a service or background message channel, depending on carrier capabilities and device settings.

The auditing server 130 is programmed to determine how archiving is performed. Therefore, the archiving protocol 225 is responsible for capturing the message content and forwarding it to the communication archive 230. The communication archive 230 is a component that can be internal to or otherwise accessible to the auditing server 130, providing secure, centralized storage of all archived messages. This protocol can operate through on-device software, network-based capture mechanisms, or vendor-managed systems. The connection from the mobile device 102 to the archiving protocol 225 represents the transition of data from the user endpoint to the auditing server 130. Archiving protocol 225 enable the auditing messages, in the same way as real user messages, to be routed through the archiving pipeline.

In some embodiments, in certain geographical regions, such as the United States, United Kingdom, Hong Kong, and Germany, the auditing server 130 can be programmed to request a carrier device to send a copy of the auditing message to the communication archive 230, while in other countries, the auditing server 130 can be programmed to request a mobile device to send a copy of the auditing message to the communication archive 230. Therefore, the archiving pipeline utilized by the archiving protocol 225 can operate over the same network infrastructure provided by the messaging network infrastructure 110. For instance, the message data can be captured on the carrier side and routed to the archive without ever traversing the mobile device itself. Alternatively, the protocol can use other available networks, such as a local area network (LAN), Wi-Fi, or enterprise VPN, especially when the device is in a corporate or home office environment. This flexible design allows the archiving vendor system 120 to operate across heterogeneous networking environments and reduces the likelihood of data loss due to connectivity constraints.

The communication archive 230 stores all captured communications, including both real and auditing digital messages. The archive receives messages from the Archiving Protocol 225 and forwards them internally to the communication archive 230, where the content is persisted in structured storage. Additionally, the communication archive 230 shares data with the validation protocol 240, enabling it to retrieve stored messages and confirm that a given auditing message was archived successfully.

The archival data 235 is the persistent layer of the archive, storing both the raw content and associated metadata of each message. It is queried by the validation protocol 240, which checks whether an auditing message, identified by its unique message identifier, has been successfully stored in the communication archive 230. This connection enables the verification step to be performed in the auditing process.

3.2. Analyzing Stored Messages to Validate Archiving

The validation protocol 240 compares the list of sent auditing messages (from the testing database 245) with the message records found in the archival data 235. For each auditing message, the validation protocol 240 verifies whether the message body and unique identifier are present in the archival data 235. If no match is found, the validation protocol 240 routes the message to non-archived messages 250. This validation feedback loop enables the detection of message loss or archival failure.

The testing database 245, which is a component internal to the auditing server 130, logs each auditing message with metadata (shown in further detail as an archival record 400 in FIG. 4) as it is created and sent. The testing database 245 receives inputs from both the messaging server 160 and the validation protocol 240, the latter of which uses it as a reference to determine which messages should have been archived. This bi-directional interaction ensures that the database remains synchronized with both dispatch and verification phases of the process. Additionally, error messages or status indications regarding archival or transmission failures are sent from the testing database 245 to the validation protocol 240 to facilitate timely detection and handling of issues.

3.3. Handling Archiving Issues

In the non-archived messages 250 block, all auditing messages that were not matched in the archive during validation are collected and logged. Copies of these auditing messages are passed to the outstanding device correction 255 process, which initiates investigation and corrective measures for the associated devices.

In the outstanding device correction 255 block, the reasons behind each archival failure are analyzed. For example, the archiving could fail because the mobile device was off or malfunctioned, the messaging application installed on the mobile device was inactive or malfunctioned, the internal databases (e.g., storing copies of auditing messages) were down or malfunctioned, or the messaging platform, aggregator device, or the carrier device was down, malfunctioned, or experienced specific environmental issues. The auditing server 130 can be programmed to make such determinations by performing simple, real-time tests (such as a ping to a mobile device), extracting logged errors or warnings, or utilizing machine learning based on prior diagnosis results. The machine learning can be trained from various types of data together with previous archiving-related, such as employee attendance or online activity records, phone logs, carrier operational schedules, external system maintenance announcement, or user bug reports or examination results. The machine learning can be supported by a classifier that learns correlations between input data and output root causes.

Using information from the non-archived message list, corrections can include transmitting instructions to various devices associated with users, administrators, aggregators, or carriers. Corrections can then include forwarding unresolved issues for escalated processing in the outstanding devices report 260. This report acts as a bridge between identification of issues and their remediation. The corrections can further include instructions to turn on a device, provide additional error codes, run a diagnostic operation and return a report, or provide an approval to limit access to a mobile device or exclude the mobile device from the archiving processing. The corrective actions including the instructions can similarly be determined using machine learning based on prior remediation data.

In the outstanding devices report 260, a structured report of devices with recurring or unresolved archiving failures is compiled. This report is delivered for reconciliation and documentation processing in the consolidating data 265 module. The report can include timestamps, device IDs, user assignments, and a classification of root causes.

In the consolidating data 265 module, data from the messaging network infrastructure 110, outstanding devices report 260, and possibly other sources is aggregated. normalization of error logs, timestamps, and user/device mapping can also be performed to create a unified summary for additional analysis by other systems. Metadata about failed messages can be communicated back to the communication archive 230, allowing the archive to log the fact that a message was expected but not archived-thus preserving audit integrity even in failure scenarios.

Figure 3:
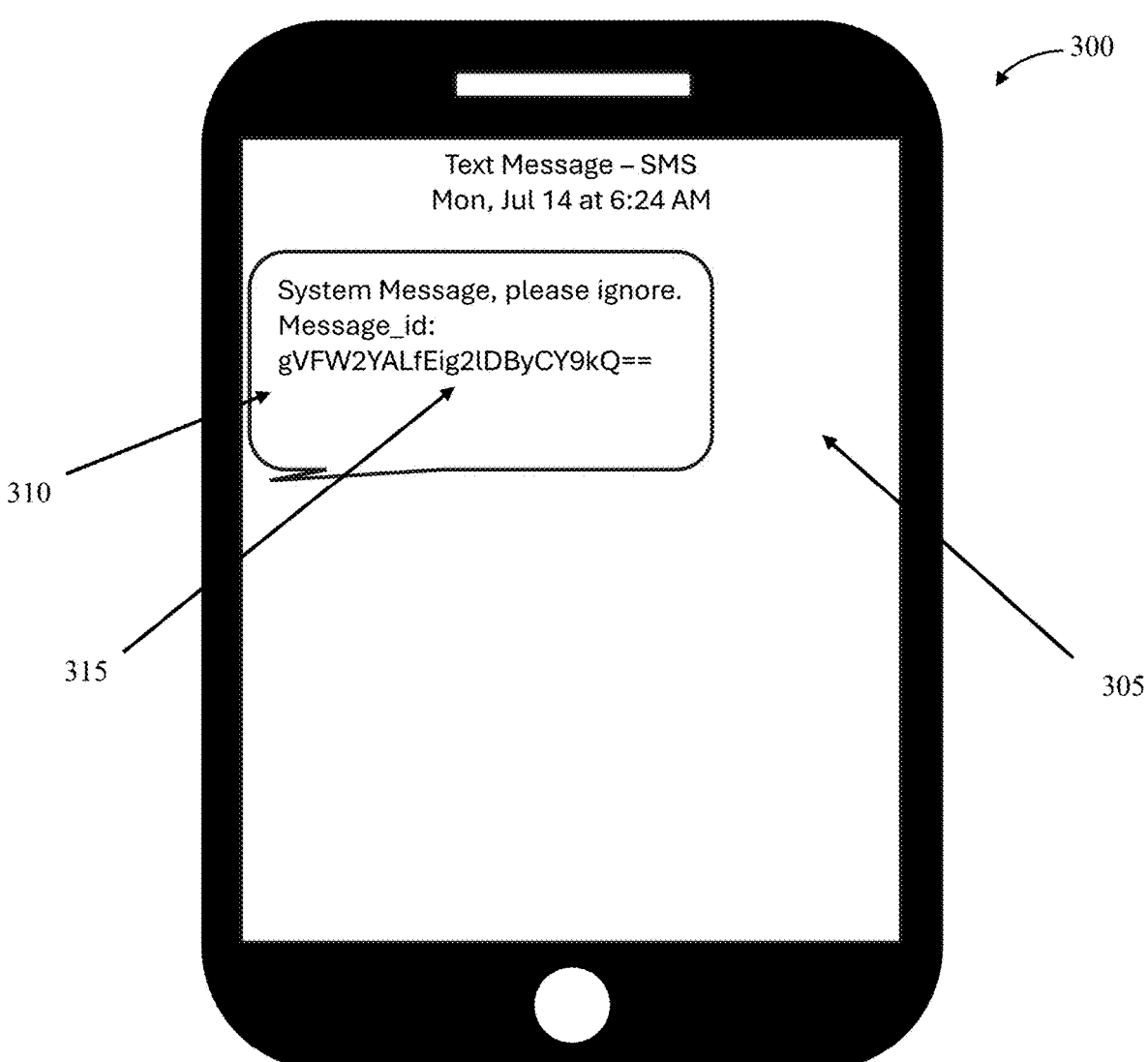
FIG. 3 illustrates an example mobile device displaying the auditing message to the end user.

FIG. 3 illustrates an example interface presented on a mobile device 300 used in connection with the message auditing system described herein. The depicted mobile device 300 can be any corporate-managed endpoint, such as a smartphone running a mobile operating system like Android or iOS. The hardware form factor can include a display screen, touchscreen input, and cellular connectivity allowing the device to send and receive SMS text messages over a wireless carrier network. The mobile device 300 shown in FIG. 3 corresponds to the mobile device 102 referenced in FIGS. 1 and 2, and can include additional components such as a messaging client, archiving agent, or enterprise device management software.

The graphical interface displayed on the mobile device includes a chat window 305 typical of native SMS messaging applications. Within the chat window 305, an incoming text message 310 is shown as having been received from an auditing message sender. This message 310 represents the auditing SMS message generated as part of the auditing validation process described in connection with the Messaging server 160 and Messaging network infrastructure 110. The auditing message 310 is intended to simulate a standard SMS communication to verify that the device 300 and associated infrastructure properly capture and archive the message content.

Embedded within the body of the incoming message 310 is a unique auditing identifier or code 315, such as a unique alphanumeric string or UUID. This unique code 315 is automatically inserted into the message body by the auditing server or messaging vendor to enable later detection of the message within the communication archive 230. The unique code 315 serves as a reliable marker that can be programmatically searched for in the communication archive 230 and its associated archival data 235. If the message containing the auditing identifier is later retrieved from the Communication Archive 230 during validation, the auditing server 130 marks the line as compliant; if not found, the line is flagged for remediation.

The user interface shown in FIG. 3 is further useful in validating message receipt as part of the auditing logic. For example, whether the device 300 actually receives and displays the auditing message can be used as part of a delivery confirmation step, distinct from archival validation. This distinction helps disambiguate cases where a message failed to archive because the message never reached the mobile device 300 at all, such as when the device 300 was powered off, out of coverage, or the archiving process was otherwise disconnected. As such, FIG. 3 visually demonstrates the device-side presence of a message that will later be verified in the communication archive 230 via a stored copy.

Because the unique code 315 is nearly impossible to guess correctly, the presence of this code on the display of mobile device 102 serves as strong evidence that the device did, in fact, receive the auditing message. Accordingly, if mobile device 102 is later identified in the outstanding devices report 260, the ability to retrieve or confirm that the code 315 was displayed allows investigators to conclude that the auditing message was received. In such cases, the failure to validate the archival process must lie further along in the sequence, either in a disruption or failure within the archiving process itself or in the inability of the testing database 245 to store or retrieve the corresponding archival record.

FIG. 4 illustrates an example archiving report 400 generated by the auditing server 130, in particular records stored in the testing database 245 and subsequently examined by the validation protocol 240 against the archival data 235 or reports generated by the validation protocol 240 as a result of the examination. This report 400 is used by the system 100 described herein to verify whether an auditing message has been successfully recorded. Particularly, the report 400 can be transmitted to the administrator device 140, in order to facilitate correction of outstanding devices. The report 400, represented as a table, contains elements of structured message data, each row corresponding to a discrete digital message record. These records can be transmitted via an application programming interface (API), file transfer protocol (FTP), or other automated data exchange mechanism from the auditing server 130 to external devices over the network 118, such as the administrator device 140 for analysis.

The report 400 includes multiple rows 401a-401c, each representing a digital message received by the archiving vendor. The table is structured with multiple columns that collectively provide the relevant information needed to determine whether a particular message was properly archived and whether any follow-up action is needed. In some embodiments, the rows are sorted chronologically or filtered to include only messages tagged with a known auditing identifier.

The Sender column 402a contains the originating phone number from which the auditing message was sent. This is typically the number associated with the messaging server 160 or auditing server 130. This field is utilized for validating the source of the message and confirming whether the message flowed through the expected communication and archiving path.

The Recipient column 402b includes contact information associated with the message recipient. This can include a user's full name, corporate email address, and one or more phone numbers. One of these phone numbers corresponds to the target mobile device being audited in the validation cycle.

The Message column 402c captures the body of the message as recorded by the archive. In some embodiments, the body of the message includes the unique code 315, which allows the validation logic to confirm that a specific auditing message was accurately archived by comparing the unique code 315 in the message column 402c to the value in the ID column 402e of the same record. By analyzing the message body, the system can detect a successful archival.

Absence of the auditing code or other portion of the message body in this column, or incorrect formatting of the content, can indicate a failure or misrouting of the message. The message body could include additional information that could be useful for diagnostic purposes. For example, the message body could include identities of various devices involved in the transmission of this message (and known before the generation of the message). The content is typically stored in plaintext or normalized to a standard character encoding format for consistency.

The Date column 402d stores the timestamp indicating when the message was sent or received, depending on system configuration. This temporal data helps ensure synchronization between the auditing schedule and the reported results, enabling the system to differentiate between newly sent messages and older archived data. It also assists in determining the duration of a message gap between message generation and receipt when data loss is detected.

Finally, the ID column 402e contains the unique code 315, which could be initially generated by the auditing server 130 before being sent to the messaging server 160 for transmission in an auditing message generated by the messaging server 160. In some embodiments, the messaging server 160 generates both the unique code 315 and the auditing message containing the unique code 315. This code is used as a key for validation and is matched against the database of expected auditing messages (e.g., stored in the Testing Database 245). In some embodiments, this column 402e is populated by parsing the message column 402c. In other embodiments, this column 402e is populated based on data prepared for effectuating the test, e.g. at the messaging server 160 stage, and can be used to compare with data returned via the archiving pipeline.

In some embodiments, additional metadata or diagnostic indicators (not shown) can be included, rendering this an archiving report, such as error codes or delivery status flags from various devices involved in the message transmission, or system-specific tags used by the archiving vendor. These optional fields provide insight into why a message can have failed to archive and are used by the Validation Protocol 240 and Outstanding Device Correction 255 blocks to determine root causes and appropriate remedial workflows. For example, an error code indicating that the message content was malformed or truncated can trigger one type of remediation, while a complete absence of a message entry can trigger a different workflow involving carrier-side diagnostics or user outreach.

4. EXAMPLE PROCESS

FIG. 5 illustrates an example process for managing message recordation using auditing messages and remedial workflows performed by a networked device in accordance with some embodiments described herein. FIG. 5 is shown in simplified, schematic format to illustrate a clear example, and other embodiments can include more, fewer, or different elements connected in various manners. FIG. 5 is intended to disclose an algorithm, plan, or outline that can be implemented in software which, when executed, cause performing the technical improvements and functional enhancements described herein.

In step 505, the system 500 receives a set of mobile device identifiers, each mobile device identifier associated with a respective mobile device of a plurality of mobile devices, each mobile device configured to receive messages.

In step 510, the system 500 stores an auditing message including a unique code in a test database. In some embodiments, the unique code is unique to the auditing message transmitted to the selected mobile device at a specific time.

In step 515, the system 500 links the auditing message with first metadata including a timestamp, mobile information regarding a selected mobile device of the plurality of mobile devices, and carrier information regarding a carrier system.

In step 520, the system 500 causes transmitting a first copy of the auditing message for delivery to the selected mobile device.

In step 525, the system 500 identifies an archiving path of devices in which the first copy of the auditing message travels before being stored in an electronic archive based on a location of the selected mobile device. In some embodiments, the archiving path includes the selected mobile device to the electronic archive, which transmits the first copy of the auditing message to the electronic archive, bypassing any external device. In some embodiments, the archiving path includes an external archiving device, which is different from the selected mobile device and transmits the first copy of the auditing message to the electronic archive.

In step 530, the system 500 receives a report indicating a status of delivering the first copy of the auditing message. In some embodiments, the report is received from an archiving device and comprises diagnostic information based on metadata related to an archiving status of the auditing message. In some embodiments, the report indicates a status of delivering the auditing message from at least one of a message aggregator or a wireless carrier, and the report comprises error codes, delivery logs, or failure reason data used to facilitate determination of the remedial workflow.

In some embodiments, the system 500 transmits or updates an auditing record to the electronic archive. The auditing record includes a copy of the auditing message and a flag indicating whether the selected mobile device received the auditing message. In some embodiments, the electronic archive stores archived messages comprising both auditing messages and other electronic communications. The system 500 can retrieve one or more additional messages of the other electronic communications from the electronic archive and display the one or more additional messages on an administrator device 140.

In some embodiments, the system 500 compares the report to a consolidated report. The consolidated report is provided by the electronic archive or a service provider associated with the selected mobile device. The system can report an audit failure when the consolidated report does not include the report.

In step 535, the system 500 determines that no match of the auditing message is stored in the electronic archive. In some embodiments, the system 500 normalizes the format of archived message data from a list of archived messages to extract a message body. The system 500 compares the unique code of the auditing message against the list of archived messages retrieved from the electronic archive. The system 500 compares additional content of the message body against the same list of archived messages to determine whether there is a match. The system 500 determines that the absence of a match indicates the auditing message was not archived.

In some embodiments, the system 500 retransmits the auditing message upon determining that the auditing message is not available in the electronic archive.

In step 540, the system 500 determines a remedial workflow based on the first metadata and the report. In some embodiments, the remedial workflow includes identifying a reason for the failure to archive the auditing message, wherein the reason comprises at least one of the following: (a) the selected mobile device was powered off or offline at the time of transmission; (b) the carrier system associated with the selected mobile device experienced a service disruption; or (c) the selected mobile device was not properly onboarded to an archiving platform or lacked the required mobile device management (MDM) configuration. In some embodiments, the remedial workflow includes disabling messaging functionality on the selected mobile device as a remedial action to prevent further loss of archiving data.

In some embodiments, a respective device of the one or more devices in the archiving path appends a device identifier to the copy of the auditing message. The device identifier uniquely identifies the respective device. Determining a remedial workflow further includes identifying a missing device of the archiving path of devices, where the missing device is absent from the device identifier appended to the copy of the auditing message.

In step 545, the system 500 sends a remedial message to an internal account or an account associated with a device in the archiving path based on the remedial workflow. In some embodiments, sending the remedial message comprises transmitting at least one of: (a) a notification to the administrator device 140 requesting that the selected mobile device be powered on or connected to a network; or (b) an instruction to an archiving device to reperform or retry archiving of the auditing message 310.

In some embodiments, the system 500 reviews a plurality of received reports related to the archiving path and corresponding audit results over a defined time period. The system 500 utilizes a machine learning module to analyze at least the reviewed data to identify patterns indicative of potential archiving failures, where the identified patterns are used to perform preventive measures to reduce future archiving issues.

5. EXAMPLE IMPLEMENTATION

According to one embodiment, the techniques described herein are implemented by at least one computing device. The techniques can be implemented in whole or in part using a combination of at least one server computer and/or other computing devices that are coupled using a network, such as a packet data network. The computing devices can be hard-wired to perform the techniques, or can include digital electronic devices such as at least one application-specific integrated circuit (ASIC) or field programmable gate array (FPGA) that is persistently programmed to perform the techniques, or can include at least one general purpose hardware processor programmed to perform the techniques pursuant to program instructions in firmware, memory, other storage, or a combination. Such computing devices can also combine custom hard-wired logic, ASICs, or FPGAs with custom programming to accomplish the described techniques. The computing devices can be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 6:
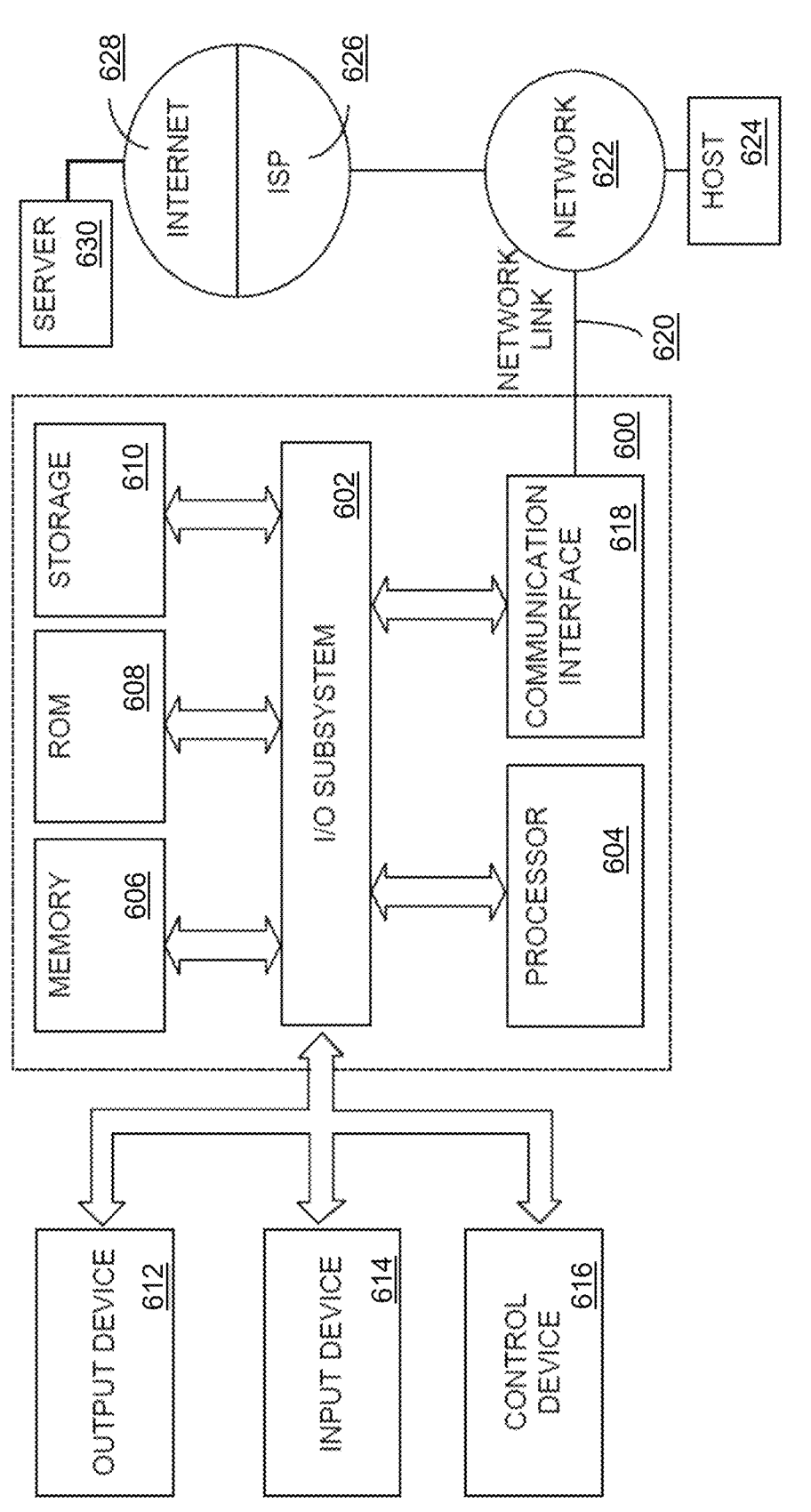
FIG. 6 illustrates a computer system upon which various embodiments of the auditing system may be implemented.

FIG. 6 is a block diagram that illustrates an example computer system with which an embodiment can be implemented. In the example of FIG. 6, a computer system 600 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 600 includes an input/output (I/O) subsystem 602 which can include a bus and/or other communication mechanism(s) for communicating information and/or instructions between the components of the computer system 600 over electronic signal paths. The I/O subsystem 602 can include an I/O controller, a memory controller and at least one I/O port. The electronic signal paths are represented schematically in the drawings, for example as lines, unidirectional arrows, or bidirectional arrows.

At least one hardware processor 604 is coupled to I/O subsystem 602 for processing information and instructions. Hardware processor 604 can include, for example, a general-purpose microprocessor or microcontroller and/or a special-purpose microprocessor such as an embedded system or a graphics processing unit (GPU) or a digital signal processor or Advanced Reduced Instruction Set Computer (RISC) Machine (ARM) processor. Processor 604 can comprise an integrated arithmetic logic unit (ALU) or can be coupled to a separate ALU.

Computer system 600 includes one or more units of memory 606, such as a main memory, which is coupled to I/O subsystem 602 for electronically digitally storing data and instructions to be executed by processor 604. Memory 606 can include volatile memory such as various forms of random-access memory (RAM) or other dynamic storage device. Memory 606 also can be used for storing temporary variables or other intermediate information during execution of instructions to be executed by processor 604. Such instructions, when stored in non-transitory computer-readable storage media accessible to processor 604, can render computer system 600 into a special-purpose machine that is customized to perform the operations specified in the instructions.

Computer system 600 further includes non-volatile memory such as read only memory (ROM) 608 or other static storage device coupled to I/O subsystem 602 for storing information and instructions for processor 604. The ROM 608 can include various forms of programmable ROM (PROM) such as erasable PROM (EPROM) or electrically erasable PROM (EEPROM). A unit of persistent storage 610 can include various forms of non-volatile RAM (NVRAM), such as flash memory, or solid-state storage, magnetic disk, or optical disk such as CD-ROM or DVD-ROM, and can be coupled to I/O subsystem 602 for storing information and instructions. Storage 610 is an example of a non-transitory computer-readable medium that can be used to store instructions and data which when executed by the processor 604 cause performing computer-implemented methods to execute the techniques herein.

The instructions in memory 606, ROM 608 or storage 610 can comprise one or more sets of instructions that are organized as modules, methods, objects, functions, routines, or calls. The instructions can be organized as one or more computer programs, operating system services, or application programs including mobile apps. The instructions can comprise an operating system and/or system software; one or more libraries to support multimedia, programming or other functions; data protocol instructions or stacks to implement Transmission Control Protocol/Internet Protocol (TCP/

IP), Hypertext Transfer Protocol (HTTP) or other communication protocols; file processing instructions to interpret and render files coded using HTML, Extensible Markup Language (XML), Joint Photographic Experts Group (JPEG), Moving Picture Experts Group (MPEG) or Portable Network Graphics (PNG); user interface instructions to render or interpret commands for a GUI, command-line interface or text user interface; application software such as an office suite, internet access applications, design and manufacturing applications, graphics applications, audio applications, software engineering applications, educational applications, games or miscellaneous applications. The instructions can implement a web server, web application server or web client. The instructions can be organized as a presentation layer, application layer and data storage layer such as a relational database system using structured query language (SQL) or NoSQL, an object store, a graph database, a flat file system or other data storage.

Computer system 600 can be coupled via I/O subsystem 602 to at least one output device 612. In one embodiment, output device 612 is a digital computer display. Examples of a display that can be used in various embodiments include a touch screen display or a light-emitting diode (LED) display or a liquid crystal display (LCD) or an e-paper display. Computer system 600 can include other type(s) of output devices 612, alternatively or in addition to a display device. Examples of other output devices 612 include printers, ticket printers, plotters, projectors, sound cards or video cards, speakers, buzzers or piezoelectric devices or other audible devices, lamps or LED or LCD indicators, haptic devices, actuators, or servos.

At least one input device 614 is coupled to I/O subsystem 602 for communicating signals, data, command selections or gestures to processor 604. Examples of input devices 614 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 616, which can perform cursor control or other automated control functions such as navigation in a graphical interface on a display screen, alternatively or in addition to input functions. Control device 616 can be a touchpad, a mouse, a trackball, or cursor direction keys for communicating direction information and command selections to processor 604 and for controlling cursor movement on the output device 612. The input device can have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 614 can include a combination of multiple different input devices, such as a video camera and a depth sensor.

In another embodiment, computer system 600 can comprise an internet of things (IoT) device in which one or more of the output device 612, input device 614, and control device 616 are omitted. Or, in such an embodiment, the input device 614 can comprise one or more cameras, motion detectors, thermometers, microphones, seismic detectors, other sensors or detectors, measurement devices or encoders and the output device 612 can comprise a special-purpose display such as a single-line LED or LCD display, one or more indicators, a display panel, a meter, a valve, a solenoid, an actuator or a servo.

When computer system 600 is a mobile computing device, input device 614 can comprise a global positioning system (GPS) receiver coupled to a GPS module that is capable of triangulating to a plurality of GPS satellites, determining and generating geo-location or position data such as latitude-longitude values for a geophysical location of the computer system 600. Output device 612 can include hardware, software, firmware, and interfaces for generating position reporting packets, notifications, pulse or heartbeat signals, or other recurring data transmissions that specify a position of the computer system 600, alone or in combination with other application-specific data, directed toward host computer 624 or server 630.

Computer system 600 can implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 600 in response to processor 604 executing at least one sequence of at least one instruction contained in main memory 606. Such instructions can be read into main memory 606 from another storage medium, such as storage 610. Execution of the sequences of instructions contained in main memory 606 causes processor 604 to perform the process steps described herein. In alternative embodiments, hard-wired circuitry can be used in place of or in combination with software instructions.

The term "storage media" as used herein refers to any non-transitory media that store data and/or instructions that cause a machine to operate in a specific fashion. Such storage media can comprise non-volatile media and/or volatile media. Non-volatile media includes, for example, optical or magnetic disks, such as storage 610. Volatile media includes dynamic memory, such as memory 606. Common forms of storage media include, for example, a hard disk, solid state drive, flash drive, magnetic data storage medium, any optical or physical data storage medium, memory chip, or the like.

Storage media is distinct from but can be used in conjunction with transmission media. Transmission media participates in transferring information between storage media. For example, transmission media includes coaxial cables, copper wire and fiber optics, including the wires that comprise a bus of I/O subsystem 602. Transmission media can also take the form of acoustic or light waves, such as those generated during radio-wave and infra-red data communications.

Various forms of media can be involved in carrying at least one sequence of at least one instruction to processor 604 for execution. For example, the instructions can initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 600 can receive the data on the communication link and convert the data to be read by computer system 600. For instance, a receiver such as a radio frequency antenna or an infrared detector can receive the data carried in a wireless or optical signal and appropriate circuitry can provide the data to I/O subsystem 602 such as place the data on a bus. I/O subsystem 602 carries the data to memory 606, from which processor 604 retrieves and executes the instructions. The instructions received by memory 606 can optionally be stored on storage 610 either before or after execution by processor 604.

Computer system 600 also includes a communication interface 618 coupled to I/O subsystem 602. Communication interface 618 provides a two-way data communication coupling to network link(s) 620 that are directly or indirectly connected to at least one communication network, such as a network 622 or a public or private cloud on the Internet. For example, communication interface 618 can be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 622 broadly represents a LAN, WAN, campus network, internetwork, or any combination thereof. Communication interface 618 can comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 618 sends and receives electrical, electromagnetic, or optical signals over signal paths that carry digital data streams representing various types of information.

Computer system 600 can also include a timer 632. The processor 604 can initiate the timer 632 to expire after an interval of time (e.g., 1 second, 1 minute, 10 minutes, etc.). In some embodiments, the processor 604 received an interrupt upon expiration of the timer 632. The processor 604 can, for instance, execute an interrupt service routine (ISR) in response to the interrupt. In some embodiments, the interrupt signals to the processor 604 that a task has failed to complete execution within a time interval that the timer 632 was initiated with.

Network link 620 typically provides electrical, electromagnetic, or optical data communication directly or through at least one network to other data devices, using, for example, satellite, cellular, Wi-Fi, or BLUETOOTH technology. For example, network link 620 can provide a connection through a network 622 to a host computer 624.

Furthermore, network link 620 can provide a connection through network 622 or to other computing devices via internetworking devices and/or computers that are operated by an Internet Service Provider (ISP) 626. ISP 626 provides data communication services through a world-wide packet data communication network represented as internet 628. To ensure data security and privacy, network communications may be encrypted using Transport Layer Security (TLS), Secure/Multipurpose Internet Mail Extensions (S/MIME), or other cryptographic methods. Network devices such as firewalls, intrusion detection/prevention systems (IDS/IPS), and proxy servers may be deployed to protect computer system 600 components from unauthorized access or cyber threats.

A server 630 can be coupled to internet 628. Server 630 broadly represents any computer, data center, virtual machine, or virtual computing instance with or without a hypervisor, or computer executing a containerized program system such as DOCKER or KUBERNETES. Server 630 can represent an electronic digital service that is implemented using more than one computer or instance and that is accessed and used by transmitting web services requests, uniform resource locator (URL) strings with parameters in HTTP payloads, application programming interface (API) calls, app services calls, or other service calls. Computer system 600 and server 630 can form elements of a distributed computing system that includes other computers, a processing cluster, server farm or other organization of computers that cooperate to perform tasks or execute applications or services. Server 630 can comprise one or more sets of instructions that are organized as modules, methods, objects, functions, routines, or calls. The instructions can be organized as one or more computer programs, operating system services, or application programs including mobile apps. The instructions can comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a GUI, command-line interface or text user interface; application software such as an office suite, internet access applications, design and manufacturing applications, graphics applications, audio applications, software engineering applications, educational applications, games or miscellaneous applications. Server 630 can comprise a web application server that hosts a presentation layer, application layer and data storage layer such as a relational database system using structured query language (SQL) or NoSQL, an object store, a graph database, a flat file system or other data storage.

Computer system 600 can send messages and receive data and instructions, including program code, through the network(s), network link 620 and communication interface 618. In the Internet example, a server 630 might transmit a requested code for an application program through Internet 628, ISP 626, local network 622 and communication interface 618. The received code can be executed by processor 604 as it is received, and/or stored in storage 610, or other non-volatile storage for later execution.

The execution of instructions as described in this section can implement a process in the form of an instance of a computer program that is being executed, and consisting of program code and its current activity. Depending on the operating system (OS), a process can be made up of multiple threads of execution that execute instructions concurrently. In this context, a computer program is a passive collection of instructions, while a process can be the actual execution of those instructions. Several processes can be associated with the same program; for example, opening up several instances of the same program often means more than one process is being executed. Multitasking can be implemented to allow multiple processes to share processor 604. While each processor 604 or core of the processor executes a single task at a time, computer system 600 can be programmed to implement multitasking to allow each processor to switch between tasks that are being executed without having to wait for each task to finish. In an embodiment, switches can be performed when tasks perform input/output operations, when a task indicates that it can be switched, or on hardware interrupts. Time-sharing can be implemented to allow fast response for interactive user applications by rapidly performing context switches to provide the appearance of concurrent execution of multiple processes simultaneously. In an embodiment, for security and reliability, an operating system can prevent direct communication between independent processes, providing strictly mediated and controlled inter-process communication functionality.

6. EXTENSIONS AND ALTERNATIVES

In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method for managing message recordation, comprising:

receiving a set of mobile device identifiers, each mobile device identifier associated with a respective mobile device of a plurality of mobile devices, each mobile device configured to receive messages;

storing an auditing message including a unique code in a test database;

linking the auditing message with first metadata including a timestamp, mobile information regarding a selected mobile device of the plurality of mobile devices, and carrier information regarding a carrier system;

causing transmitting a first copy of the auditing message for delivery to the selected mobile device;

identifying an archiving path of devices in which the first copy of the auditing message travels before being stored in an electronic archive based on a location of the selected mobile device;

receiving a report indicating a status of delivering the first copy of the auditing message;

determining that no match of the auditing message is stored in the electronic archive;

determining a remedial workflow based on the first metadata and the report;

sending a remedial message to an internal account or an account associated with a device in the archiving path based on the remedial workflow, wherein the method is performed by one or more processors.

2. The method of claim 1, wherein determining that no match of the auditing message is stored in the electronic archive comprises:

normalizing a format of archived message data of a list of archived messages to extract a message body;

comparing the unique code of the auditing message against the list of archived messages retrieved from the electronic archive;

comparing additional content of the message body against the list of archived messages retrieved from the electronic archive based on the comparing to determine whether there is a match;

determining absence of a match as an indication that the auditing message was not archived.

3. The method of claim 1, wherein the remedial workflow includes identifying a reason for a failure to archive the auditing message, the reason comprising at least one of:

(a) the selected mobile device was powered off or offline at a time of transmission;

(b) the carrier system associated with the selected mobile device experienced a service disruption; or

23

(c) the selected mobile device was not properly onboarded to an archiving platform or lacked required mobile device management (MDM) configuration.

4. The method of claim 1, wherein sending the remedial message comprises transmitting at least one of:

(a) a notification to an administrator device requesting that the selected mobile device be powered on or connected to a network; or (b) an instruction to an archiving device to reperform or retry archiving of the auditing message.

5. The method of claim 1, wherein the remedial workflow includes disabling messaging functionality on the selected mobile device as a remedial action to prevent further loss of archiving data.

6. The method of claim 1, further comprising transmitting or updating an auditing record to the electronic archive, the auditing record including a second copy of the auditing message and a flag indicating whether the selected mobile device received the auditing message.

7. The method of claim 1, the report being received from an archiving device and comprising diagnostic information based on metadata related to an archiving status of the auditing message.

8. The method of claim 1, further comprising:

reviewing a plurality of received reports related to the archiving path and corresponding audit results over a defined time period; and utilizing a machine learning module to analyze at least the reviewed data to identify patterns indicative of potential archiving failures, wherein the identified patterns are used to perform preventive measures to reduce future archiving issues.

9. The method of claim 1, wherein:

the report indicates the status of delivering the first copy of the auditing message from at least one of a message aggregator or a wireless carrier; and the report comprises error codes, delivery logs, or failure reason data used to facilitate determination of the remedial workflow.

10. The method of claim 1, wherein the unique code is unique to the auditing message transmitted to the selected mobile device at a specific time.

11. The method of claim 1, the archiving path including the selected mobile device to the electronic archive, which transmits the first copy of the auditing message to the electronic archive bypassing any external device.

12. The method of claim 1, wherein:

a respective device of the devices in the archiving path appends a device identifier to the first copy of the auditing message;

the device identifier uniquely identifies the respective device; and determining the remedial workflow further includes identifying a missing device of the archiving path of devices, wherein the missing device is absent from the device identifier appended to the first copy of the auditing message.

13. The method of claim 1, the archiving path including an external archiving device, which is different from the selected mobile device and transmits the first copy of the auditing message to the electronic archive.

14. The method of claim 1, wherein the electronic archive stores archived messages comprising both auditing messages and other electronic communications, further comprising:

retrieving one or more additional messages of the other electronic communications from the electronic archive; and displaying the one or more additional messages on an administrator device.

15. The method of claim 1, further comprising:

comparing the report to a consolidated report, the consolidated report provided by the electronic archive or a service provider associated with the selected mobile device; and reporting an audit failure when the consolidated report does not include the report.

16. The method of claim 1, further comprising retransmitting the auditing message upon determining that the auditing message is not available in the electronic archive.

17. A non-transitory, computer-readable medium storing instructions that, when executed, cause one or more processors to perform:

receiving a set of mobile device identifiers, each mobile device identifier associated with a respective mobile device of a plurality of mobile devices, each mobile device configured to receive messages;

storing an auditing message including a unique code in a test database;

linking the auditing message with first metadata including a timestamp, mobile information regarding a selected mobile device of the plurality of mobile devices, and carrier information regarding a carrier system;

causing transmitting a first copy of the auditing message for delivery to the selected mobile device;

identifying an archiving path of devices in which the first copy of the auditing message travels before being stored in an electronic archive based on a location of the selected mobile device;

receiving a report indicating a status of delivering the first copy of the auditing message;

determining that no match of the auditing message is stored in the electronic archive;

determining a remedial workflow based on the first metadata and the report;

sending a remedial message to an internal account or an account associated with a device in the archiving path based on the remedial workflow.

18. A system for managing message recordation, comprising:

a memory; and one or more processors coupled to the memory and configured to perform:

receiving a set of mobile device identifiers, each mobile device identifier associated with a respective mobile device of a plurality of mobile devices, each mobile device configured to receive messages;

storing an auditing message including a unique code in a test database;

linking the auditing message with first metadata including a timestamp, mobile information regarding a selected mobile device of the plurality of mobile devices, and carrier information regarding a carrier system;

causing transmitting a first copy of the auditing message for delivery to the selected mobile device;

identifying an archiving path of devices in which the first copy of the auditing message travels before being stored in an electronic archive based on a location of the selected mobile device;

receiving a report indicating a status of delivering the first copy of the auditing message;

determining that no match of the auditing message is stored in the electronic archive;

determining a remedial workflow based on the first metadata and the report; and sending a remedial message to an internal account or an account associated with a device in the archiving path based on the remedial workflow.

19. The system of claim 18, wherein sending the remedial message comprises transmitting at least one of:

(a) a notification to an end user of the selected mobile device requesting that the device be powered on or connected to a network; or (b) an instruction to an archiving device to reperform or retry archiving of the auditing message.

20. The system of claim 18, wherein the one or more processors are further configured to perform:

normalizing a format of archived message data of a list of archived messages retrieved from the electronic archive to extract a message body;

comparing the unique code of the auditing message against the list of archived messages;

comparing additional content of the message body against the list of archived messages; and determining, based on the comparisons, whether there is a match, wherein absence of a match is used to confirm that the auditing message was not archived.

* * * * *